United States Patent
Kenjo et al.

(10) Patent No.: US 12,468,544 B2
(45) Date of Patent: Nov. 11, 2025

(54) ARITHMETIC DEVICE AND COMPUTER PROGRAM

(71) Applicant: KYB Corporation, Tokyo (JP)

(72) Inventors: Kazunori Kenjo, Kanagawa (JP); Hiroshi Yoshida, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 97 days.

(21) Appl. No.: 18/164,437

(22) Filed: Feb. 3, 2023

(65) Prior Publication Data
US 2023/0350692 A1  Nov. 2, 2023

(30) Foreign Application Priority Data
Mar. 30, 2022 (JP) .................. 2022-057386

(51) Int. Cl.
*G06F 9/4401* (2018.01)

(52) U.S. Cl.
CPC .................. *G06F 9/4403* (2013.01)

(58) Field of Classification Search
CPC ....... G06F 9/4403; G06F 3/123; G06F 21/572
See application file for complete search history.

(56) References Cited

U.S. PATENT DOCUMENTS

| | | | |
|---|---|---|---|
| 5,826,211 A | 10/1998 | Kobayashi | |
| 2016/0219051 A1* | 7/2016 | Morita | H04L 63/0869 |
| 2017/0060559 A1* | 3/2017 | Ye | G06F 8/65 |
| 2021/0303237 A1* | 9/2021 | Todaka | G06F 3/1236 |
| 2022/0284743 A1* | 9/2022 | Yoshimi | G06F 16/2358 |

FOREIGN PATENT DOCUMENTS

| | | | |
|---|---|---|---|
| JP | H09-160766 A | | 6/1997 |
| JP | 2003114861 A | | 4/2003 |
| JP | 2003216220 A | | 7/2003 |
| JP | 2005252770 A | | 9/2005 |
| JP | 2010178089 A | * | 8/2010 |
| JP | 2012093961 A | | 5/2012 |

* cited by examiner

*Primary Examiner* — Hyun Soo Kim
(74) *Attorney, Agent, or Firm* — Rabin & Berdo, P.C.

(57) ABSTRACT

An arithmetic device includes a communication unit that communicates with another instrument, a first activation unit to which a first address is set, and a second activation unit to which a second address is set and at which a computer program can be updated by the first activation unit. When having determined that information of update that can be performed by the first activation unit is included in information acquired by the communication unit, the second activation unit transmits the second address to the first activation unit. When having received the second address from the second activation unit, the first activation unit changes the first address to the second address, establishes communication with the other instrument based on the second address, and performs update at the second activation unit based on update information transmitted from the other instrument.

2 Claims, 3 Drawing Sheets

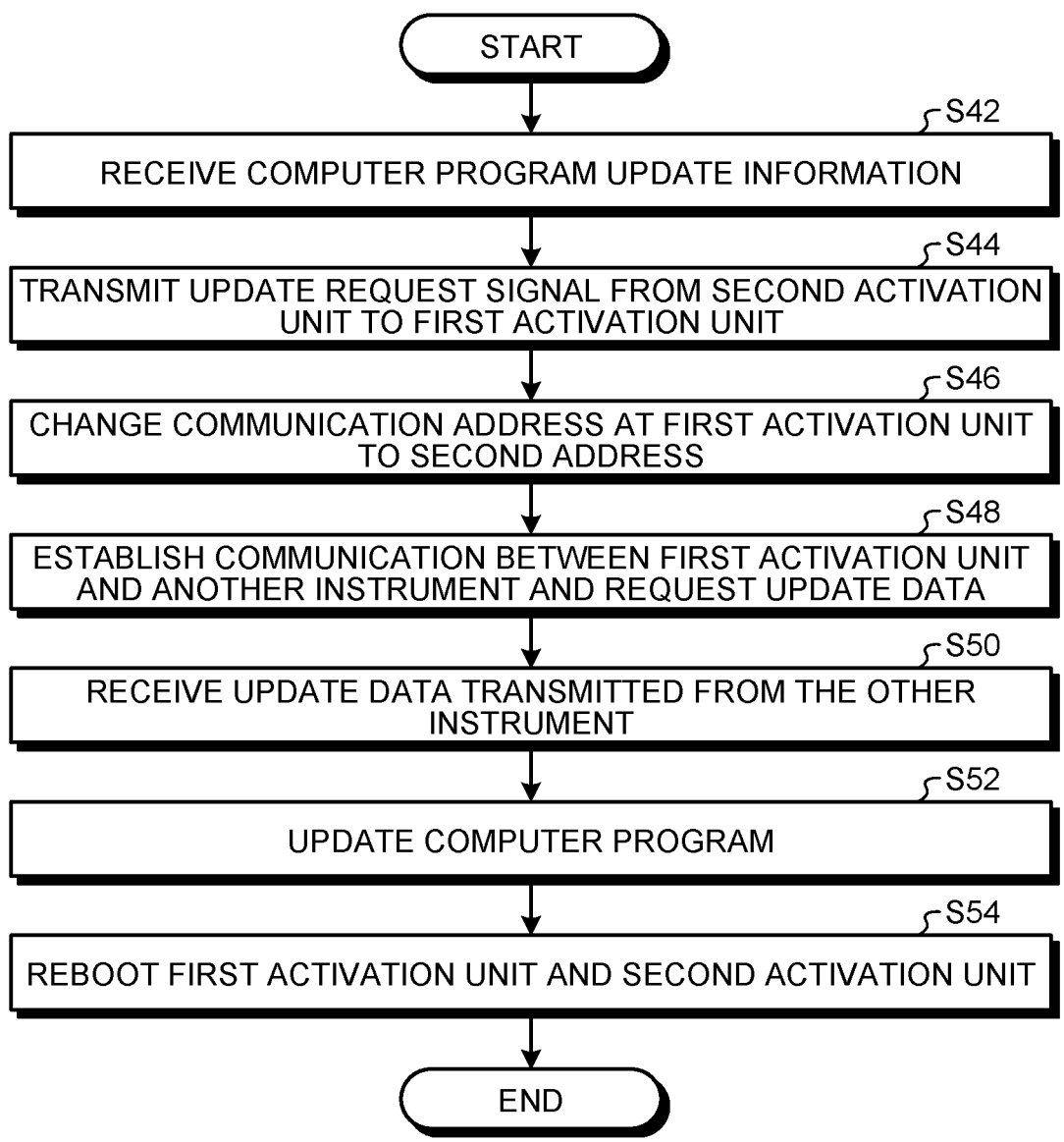

ARITHMETIC DEVICE AND COMPUTER PROGRAM

CROSS-REFERENCE TO RELATED APPLICATIONS

This application claims priority from Japanese Application No. 2022-057386, filed on Mar. 30, 2022, the contents of which are incorporated by reference herein in its entirety.

BACKGROUND OF THE INVENTION

1. Field of the Invention

The present invention relates to an arithmetic device and a computer program.

2. Description of the Related Art

Some arithmetic devices configured to control operation of a control target that is an electronic control unit (ECU) mounted on an automobile or the like include a plurality of regions and communicate with another instrument specified by exchanging information such as identification information (identification number) based on set definitions when establishing communication (refer to Japanese Patent Application Laid-open No. H09-160766).

An arithmetic device configured to control a control target instrument that is a mass-produced product such as an automobile component is used in common for a plurality of kinds of automobiles. The arithmetic device communicates with various kinds of instruments at shipment examination, use, and the like. In the arithmetic device, unique identification information can be set to each of a plurality of regions to enable communication between each region and another instrument, but typically, all the regions are set with the same identification information.

The control target instrument is subjected to a shipment examination at shipment in some cases, and setting with identification information used by a manufacturer needs to be performed in the shipment examination to enable communication with an examination machine. However, setting with particular identification information is requested by a user in some cases.

The request can be handled by a method of setting identification information in accordance with the user before the examination and a method of changing identification information after the examination. However, in the method of setting identification information in accordance with the user before the examination, communication with an examination machine is performed by using identification information set for each user, and thus, when there are a plurality of users, examination machines need to be provided in accordance with the number of pieces of identification information. In the method of changing identification information after the examination, failure having occurred at change of identification information potentially cannot be detected.

SUMMARY OF THE INVENTION

It is an object of the present invention to at least partially solve the problems in the conventional technology.

An arithmetic device of the present disclosure comprises: a communication unit that communicates with another instrument; a first activation unit to which first identification information is set; and a second activation unit to which second identification information is set and at which a computer program can be updated by the first activation unit, wherein the second activation unit transmits the second identification information to the first activation unit when having determined that information of update that can be performed by the first activation unit is included in information acquired by the communication unit, and when having received the second identification information from the second activation unit, the first activation unit changes the first identification information to the second identification information, establishes communication with the other instrument based on the second identification information, and performs update at the second activation unit based on update information transmitted from the other instrument.

A computer program of the present disclosure executes an arithmetic device including a communication unit that communicates with another instrument, a first activation unit to which first identification information is set, and a second activation unit to which second identification information is set and at which a computer program can be updated by the first activation unit, wherein when having determined that information of update that can be performed by the first activation unit is included in information acquired by the communication unit, the second activation unit executes a step of transmitting the second identification information to the first activation unit, and when having received the second identification information from the second activation unit, the first activation unit executes a step of changing the first identification information to the second identification information, establishing communication with the other instrument based on the second identification information, and performing update at the second activation unit based on update information transmitted from the other instrument.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart illustrating exemplary update processing by the arithmetic device.

DETAILED DESCRIPTION OF THE PREFERRED EMBODIMENTS

The following describes a preferable embodiment of the present invention in detail with reference to the accompanying drawings. The present invention is not limited by the embodiment described below.

Control System

Figure 1:
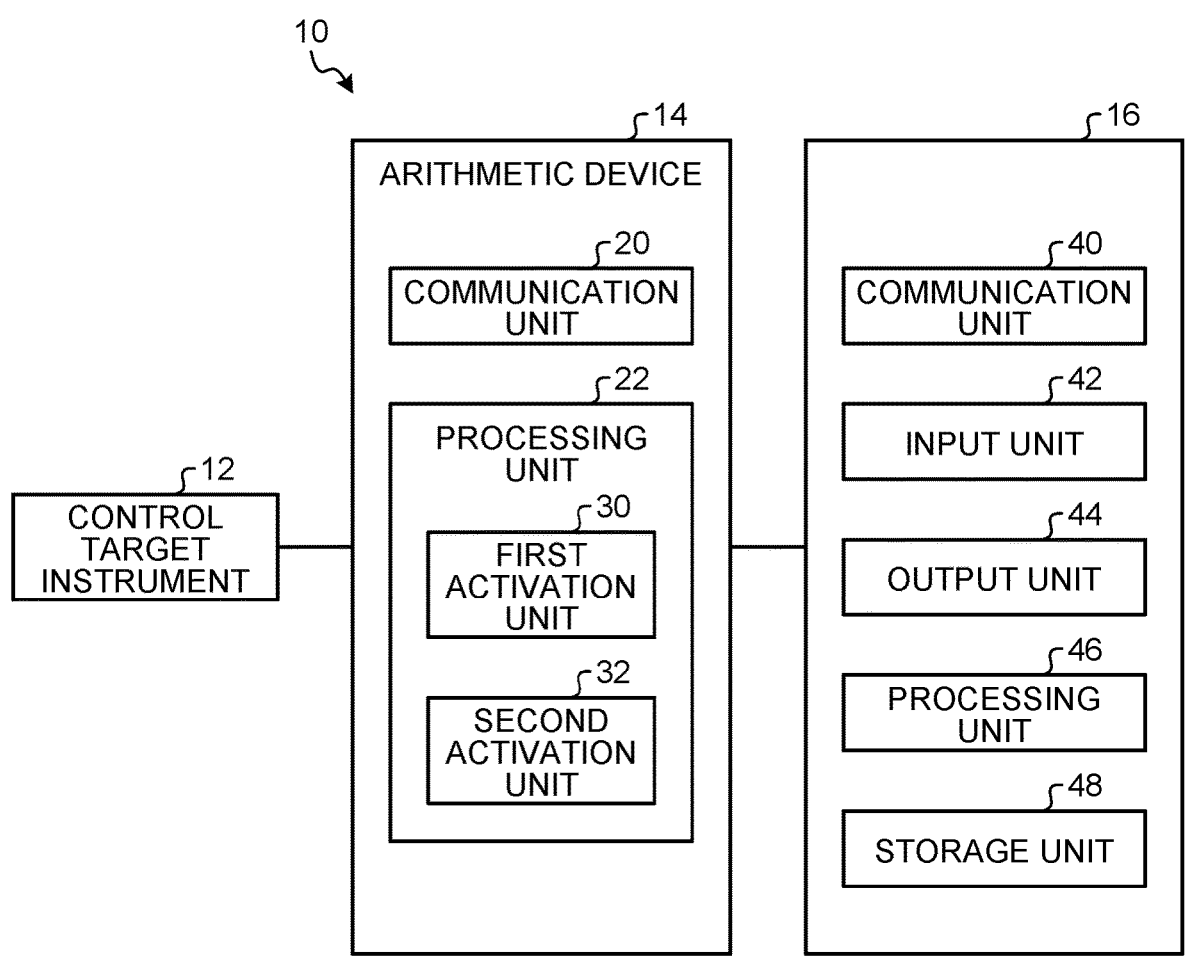
FIG. 1 is a schematic block diagram of a control system including an arithmetic device according to the present embodiment.

FIG. 1 is a schematic block diagram of a control system according to the present embodiment. As illustrated in FIG. 1, this control system 10 according to the present embodiment includes a control target instrument 12 and an arithmetic device 14. In the control system 10, operation of the control target instrument 12 is controlled by the arithmetic device 14. In the control system 10, the arithmetic device 14 communicates with a system management device 16 as another instrument to perform reception of data acquired by the arithmetic device 14 and update of a computer program and a processing condition stored in the arithmetic device 14.

The operation of the control target instrument 12 is controlled by the arithmetic device 14. The control target instrument 12 is not particularly limited but is an engine, a transmission, a suspension device, a motor, a camera, a sensor, a display device, a drive support device, or the like in a case of an automobile. The operation of the control target instrument 12 is controlled based on an instruction input from the arithmetic device 14. The control target instrument 12 may output detected information to the arithmetic device 14.

The arithmetic device 14 is an electronic control unit (ECU) or the like and controls the operation of the control target instrument 12. The arithmetic device 14 includes a communication unit 20 and a processing unit 22. The communication unit 20 is a communication module that communicates with an external device and is, for example, an antenna. The communication unit 20 communicates with the control target instrument 12 and a communication unit 40 of the system management device 16, which will be described later. Communication may be performed through a wired network such as a control area network (CAN) or through a wireless network.

The processing unit 22 is a central processing unit (CPU) and includes a first activation unit 30 and a second activation unit 32.

The first activation unit 30 executes activation processing when having detected activation of a power source, for example, turn-on of an ignition switch of an engine. The first activation unit 30 activates the second activation unit 32 and executes update (rewriting) of a computer program (software) at the second activation unit 32. A first address as first identification information that can be set by a manufacturer is set to the first activation unit 30. The first address is used by the manufacturer mainly at a shipment examination and used to perform communication with an examination machine or the like. Upon a communication request with the first address, the first activation unit 30 establishes communication based on the first address.

The second activation unit 32 is activated by the first activation unit 30 and controls the operation of the control target instrument 12. A second address as second identification information in accordance with a request from a user is set to the second activation unit 32. The system management device 16 as another instrument in the present example is a device that requests communication with the second address. Upon a communication request with the second address from the system management device 16, the second activation unit 32 establishes communication based on the second address.

In this manner, different pieces of identification information can be set to the first activation unit 30 and the second activation unit 32, respectively.

The arithmetic device 14 performs the activation processing based on activation of the power source through the first activation unit 30. In addition, the arithmetic device 14 executes update processing when update information of a computer program (software) that controls the operation of the control target instrument 12 is transmitted from the system management device 16 to the second activation unit 32.

The system management device 16 transmits and receives data through communication with the arithmetic device 14. The system management device 16 can perform information update such as computer program update.

The system management device 16 includes the communication unit 40, an input unit 42, an output unit 44, a processing unit 46, and a storage unit 48. The communication unit 40 is a communication module that communicates with an external device and is, for example, an antenna. The communication unit 40 communicates with the arithmetic device 14. The input unit 42 is a user interface that receives an operation (input) by the user and may be, for example, a mouse or a keyboard. The output unit 44 is a device that outputs information and may be, for example, a display.

The processing unit 46 is a central processing unit (CPU). The storage unit 48 is a memory that stores the contents of calculation at the processing unit 46, computer programs, and various kinds of information and includes at least one of a random access memory (RAM), a main storage device such as a read only memory (ROM), and a non-transitory storage device such as a flash memory or a hard disk drive (HDD).

Figure 2:
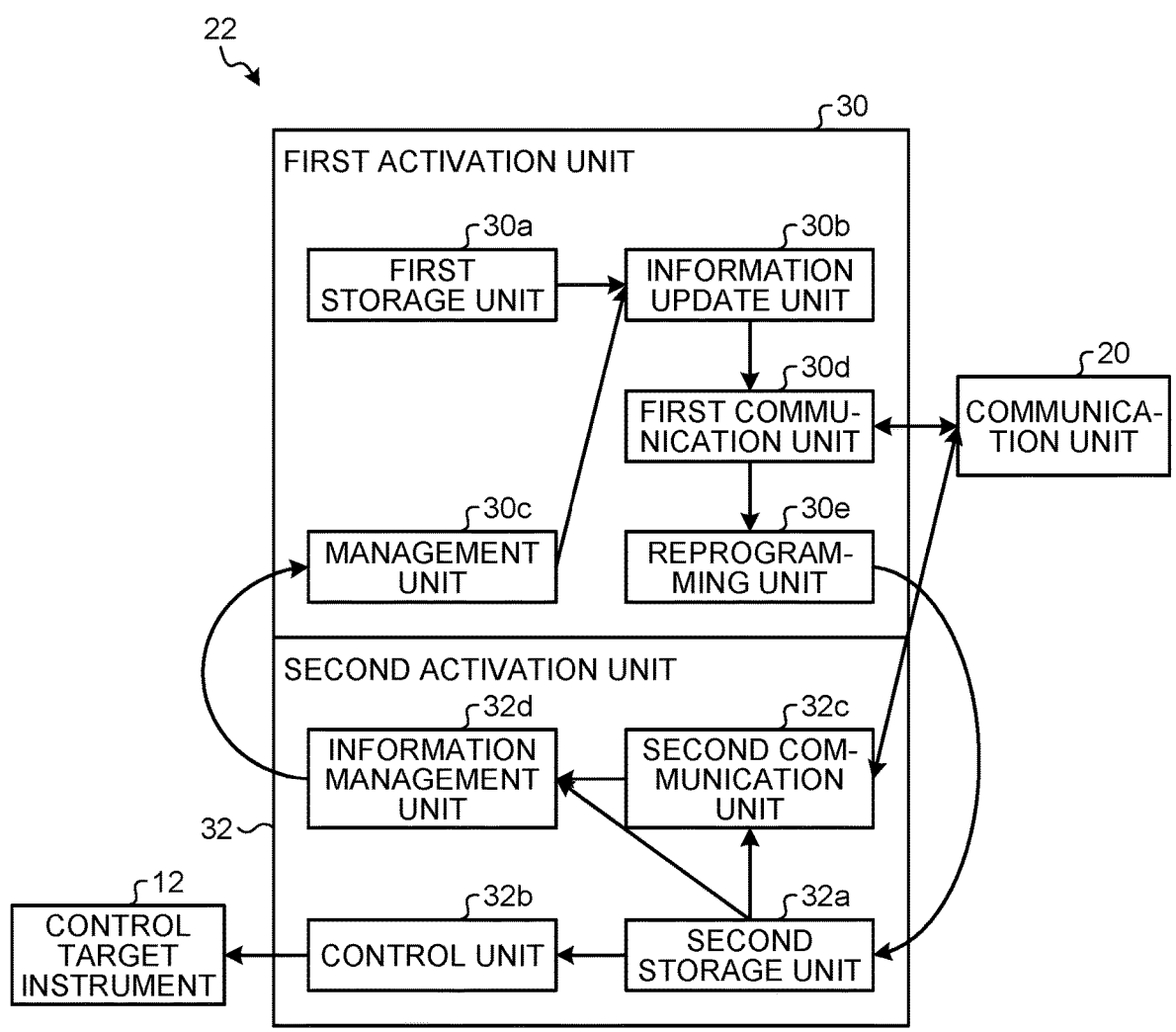
FIG. 2 is an explanatory diagram for description of exemplary processing by the arithmetic device.

The following describes the update processing of a computer program with reference to FIG. 2. FIG. 2 is an explanatory diagram for description of exemplary processing at the arithmetic device. FIG. 2 corresponds to processing of establishing communication upon a request to update a computer program at the arithmetic device 14.

As illustrated in FIG. 2, the first activation unit 30 includes a first storage unit 30*a*, an information update unit 30*b*, a management unit 30*c*, a first communication unit 30*d*, and a reprogramming unit 30*e*. The first storage unit 30*a* stores the first address set by the manufacturer. The information update unit 30*b* rewrites the first address to the second address. The management unit 30*c* stores information from the second activation unit 32. The first communication unit 30*d* performs transmission and reception with the system management device 16 by using the second address. The reprogramming unit 30*e* updates a computer program that is stored in the second activation unit 32 and controls the operation of the control target instrument 12.

The second activation unit 32 includes a second storage unit 32*a*, a control unit 32*b*, a second communication unit 32*c*, and an information management unit 32*d*. The second storage unit 32*a* stores the second address set in accordance with a request from the user, and a computer program for controlling drive of the control target instrument 12. The control unit 32*b* controls the operation of the control target instrument 12 based on the computer program stored in the second storage unit 32*a*. The second communication unit 32*c* communicates with the system management device 16 by using the second address. The information management unit 32*d* transmits information of the second address of the second activation unit 32 and the like to the first activation unit 30.

The first storage unit 30*a* and the second storage unit 32*a* are each a memory that stores information of an address used for communication, a computer program that controls the operation of the target control instrument 12, and various kinds of information, and each include at least one of a random access memory (RAM), a main storage device such as a read only memory (ROM), and a non-transitory storage device such as a flash memory or a hard disk drive (HDD).

The second communication unit 32*c* of the arithmetic device 14 receives, through the communication unit 20 of the arithmetic device 14, computer program update information transmitted from the communication unit 40 of the system management device 16. The computer program update information transmitted from the system management device 16 includes identification information of a communication instrument. Specifically, the computer program update information includes information of an address as identification information that specifies the arithmetic device 14, and the address includes a CCP ID, an RX ID, a TX ID, or the like. The address that specifies the arithmetic device 14 corresponds to the second identification information. Thus, when the second communication unit 32c of the second activation unit 32 has detected the computer program update information, the arithmetic device 14 establishes communication with the system management device 16 based on a second identification signal. When computer program update is possible, the arithmetic device 14 transmits a signal that enables communication to the system management device 16.

Computer program update (rewriting) at the second storage unit 32a can be executed only by the reprogramming unit 30e of the first activation unit 30. However, since the first address is set to the first activation unit 30, the first activation unit 30 cannot communicate with the system management device 16 that requests communication with the second address. In other words, the first activation unit 30 cannot receive the computer program update information from the system management device 16.

Thus, when having received update information of a computer program that can be updated by the first activation unit 30, the second communication unit 32c transmits a notification of a request to update the computer program to the information management unit 32d. Accordingly, the information management unit 32d reads information of the second address from the second storage unit 32a. Then, the information management unit 32d transmits, to the management unit 30c of the first activation unit 30, a notification of the request to update the computer program, and update request information that is information of the second address. In other words, when having determined that information acquired through the communication unit 20 includes update information of a computer program that can be updated by the first activation unit 30, the second activation unit 32 transmits information of the second address to the first activation unit 30.

When the update request information is input to the management unit 30c, the first activation unit 30 causes the information update unit 30b to temporarily read information of the first address from the first storage unit 30a and causes the information update unit 30b to read information of the second address from the management unit 30c. When the information of the second address is input to the information update unit 30b, the first activation unit 30 rewrites (changes) the temporarily read first address to the second address.

After the address rewriting is completed, the information update unit 30b transmits the information of the second address to the first communication unit 30d. Accordingly, the first communication unit 30d establishes communication with the system management device 16 based on the second address and requests the system management device 16 for computer program update data. When requested for the computer program update data by the arithmetic device 14, the system management device 16 transmits the computer program update data. The first communication unit 30d forwards the computer program update data to the reprogramming unit 30e, and the reprogramming unit 30e performs computer program update at the second activation unit 32 based on the computer program update data.

When the computer program update is completed, the second activation unit 32 reboots the processing unit 22. Accordingly, address information input to the information update unit 30b of the first activation unit 30 is deleted and the first activation unit 30 becomes ready for establishing communication based on the first address stored in the first storage unit 30a.

The following describes, with reference to FIG. 3, processing when the second activation unit 32 has received update information of a computer program that can be updated by the first activation unit 30. FIG. 3 is a flowchart illustrating exemplary update processing at the second activation unit of the arithmetic device. The arithmetic device 14 executes the processing illustrated in FIG. 3 when having detected transmission of data related to update from the system management device 16 in a state in which communication is established between the second activation unit 32 and the system management device 16.

The arithmetic device 14 receives the computer program update information (step S42).

The arithmetic device 14 transmits, to the management unit 30c, a notification that the second activation unit 32 is requested to update a computer program, and the update request information that is information of the second address (step S44). The first activation unit 30 checks whether the update request information exists in the management unit 30c, and when the update request information exists, the first activation unit 30 causes the information update unit 30b to read information of the first address and information of the second address and changes the first address to the second address (step S46).

The first activation unit 30 establishes communication with the system management device 16 based on the second address to which the change is made, and requests the computer program update data (step S48). Specifically, the arithmetic device 14 causes the first activation unit 30 to transmit the information of the second address to the system management device 16 and establish communication between the first activation unit 30 and the system management device 16, and requests the computer program update data. The arithmetic device 14 receives, at the first activation unit 30, the computer program update data transmitted from the system management device 16 (step S50).

The arithmetic device 14 executes computer program update at the second activation unit 32 based on the computer program update data received at the first activation unit 30 (step S52). When the computer program update is completed, the arithmetic device 14 reboots the arithmetic device 14 (step S54) and completes the processing.

Effects

As described above, even when different addresses (identification information) are set to the first activation unit 30 and the second activation unit 32, respectively, the arithmetic device 14 according to the present embodiment can establish communication between the first activation unit 30 and another instrument by rewriting the first address used for communication with the first activation unit 30 to the second address of the second activation unit 32 upon a request to update a computer program (software) after communication is established by the second activation unit 32. Thus, it is possible to update a computer program at the second activation unit 32 when the computer program update data for the second activation unit 32 is acquired from another instrument that can access to the second activation unit 32. Accordingly, the first address of the first activation unit 30 can be set to a common address irrespective of the user by the manufacturer, and the second address of the second activation unit 32 can be set to an address in accordance with a request from the user. Since the first address of the first activation unit 30 does not need to be changed, an examination machine corresponding to the second address requested by the user does not need to be prepared. Moreover, no change after a shipment examination or the like is necessary, and thus failure in rewriting at the first activation unit 30 can be prevented.

In the present embodiment, the first activation unit 30 includes the information update unit 30b that temporarily reads the first address and the second address. When the second address is transmitted from the second activation unit 32, the first activation unit 30 transmits the first address and the second address to the information update unit 30b and causes the information update unit 30b to change the first address to the second address. Since change to the second address is performed at the information update unit 30b that temporarily reads the first address and the second address, communication can be established based on the second address only at communication with the system management device 16.

In the present embodiment, the second activation unit 32 reboots the first activation unit 30 and the second activation unit 32 after update is completed. When the reboot is performed, the information update unit 30b deletes the first address and the second address read by the information update unit 30b. Accordingly, the first activation unit 30 can perform communication with the first address after update is completed.

According to the present invention, identification information that can be used by a manufacturer can be set irrespective of a user, and identification information in accordance with a request by the user can be set as well.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for an arithmetic device that includes a communication device that communicates with another instrument, the method comprising:
providing
a first activation unit to which first identification information is set, the first activation unit including an information update unit, and
a second activation unit to which second identification information is set and at which a computer program can be updated by the first activation unit;
transmitting, using the second activation unit, the second identification information to the first activation unit when having determined that information of update that can be performed by the first activation unit is included in information acquired by the communication device;
when having received the second identification information from the second activation unit, changing, using the first activation unit, the first identification information to the second identification information, establishing communication with the other instrument based on the second identification information, and performing update at the second activation unit based on update information transmitted from the other instrument;
temporarily reading the first identification information and the second identification information;
upon transmission of the second identification information from the second activation unit, transmitting, using the first activation unit, the first identification information and the second identification information to the information update unit;
changing, using the information update unit, the first identification information to the second identification information;
rebooting, using the second activation unit, the first activation unit and the second activation unit after the update is completed; and
upon the reboot, deleting, using the information update unit, the first identification information and the second identification information read by the information update unit.

2. A non-transitory storage medium containing computer program instructions that are executable by an arithmetic device including a communication device that communicates with another instrument, and
a processor,
the computer program instructions comprising:
first computer program instructions that are executed by the processor to provide functions of a first activation unit to which first identification information is set, and a second activation unit to which second identification information is set and at which a computer program can be updated by the first activation unit;
second computer program instructions that are executed by the processor to, when having determined that information of update that can be performed by the first activation unit is included in information acquired by the communication device, cause the second activation unit to execute a step of transmitting the second identification information to the first activation unit;
third computer program instructions that are executed by the processor to, when having received the second identification information from the second activation unit, cause the first activation unit to execute a step of changing the first identification information to the second identification information, to establish communication with the other instrument based on the second identification information, and to perform update at the second activation unit based on update information transmitted from the other instrument;
fourth computer program instructions that are executed by the processor to temporarily read the first identification information and the second identification information;
fifth computer program instructions that are executed by the processor to, upon transmission of the second identification information from the second activation unit, cause the first activation unit to transmit the first identification information and the second identification information to the information update unit;
sixth computer program instructions that are executed by the processor to cause the information update unit to change the first identification information to the second identification information;
seventh computer program instructions that are executed by the processor to cause the second activation unit to reboot the first activation unit and the second activation unit after the update is completed; and
eighth computer program instructions that are executed by the processor to, upon the reboot, cause the information update unit to delete the first identification information and the second identification information read by the information update unit.

* * * * *